US010651492B2

(12) United States Patent
Harper et al.

(10) Patent No.: US 10,651,492 B2
(45) Date of Patent: May 12, 2020

(54) INTEGRATED SYSTEM FOR ELECTROCHEMICAL ENERGY STORAGE SYSTEM

(75) Inventors: Matthew Albert MacLennan Harper, Vancouver (CA); Gary Lepp, North Vancouver (CA)

(73) Assignee: VRB ENERGY INC., George Town, Grand Cayman (KY)

(*) Notice: Subject to any disclaimer, the term of this patent is extended or adjusted under 35 U.S.C. 154(b) by 0 days.

(21) Appl. No.: 12/820,972

(22) Filed: Jun. 22, 2010

(65) Prior Publication Data

US 2011/0311896 A1 Dec. 22, 2011

(51) Int. Cl.
*H01M 8/04* (2016.01)
*H01M 8/24* (2016.01)
(Continued)

(52) U.S. Cl.
CPC ............ *H01M 8/188* (2013.01); *H01M 8/20* (2013.01); *H01M 8/248* (2013.01);
(Continued)

(58) Field of Classification Search
CPC .. H01M 8/0432; H01M 8/0438; H01M 8/188; H01M 8/20; H01M 8/2455;
(Continued)

(56) References Cited

U.S. PATENT DOCUMENTS

| 4,786,567 A | 11/1988 | Skyllas-Kazacos et al. |
| 4,908,281 A * | 3/1990 | O'Callaghan ................ 429/405 |

(Continued)

FOREIGN PATENT DOCUMENTS

| EP | 0814527 A2 | 12/1997 |
| EP | 1284513 A1 | 2/2003 |

(Continued)

OTHER PUBLICATIONS

International Preliminary Report on Patentability for PCT/US2011/038607 filed May 31, 2011, and dated Jan. 10, 2013, 7 pgs.
(Continued)

*Primary Examiner* — Lingwen R Zeng
(74) *Attorney, Agent, or Firm* — Stoel Rives LLP (57) ABSTRACT

The present disclosure relates to electrochemical energy storage systems. In particular, the present disclosure relates to particular systems and methods for providing a compact framework in which to house an electrochemical energy storage system. Various embodiments of electrochemical energy storage systems are disclosed that include a flow manifold and a flow manifold cover. The flow manifold may provide a plurality of channels for distributing liquid reactant to an electrical cell stack. The flow manifold may be utilized in conjunction with a flow manifold cover. The flow manifold cover may be configured to support a variety of components of a liquid reactant distribution system. Such components may include liquid reactant pump motors, inlet and outlet ports, a reference cell, and a variety of sensors. The distribution of liquid reactants to the cell stack from the inlet and outlet ports may be accomplished by way of the flow manifold cover.

20 Claims, 6 Drawing Sheets

(51) Int. Cl.
  *H01M 8/18*    (2006.01)
  *H01M 8/2483*  (2016.01)
  *H01M 8/20*    (2006.01)
  *H01M 8/2455*  (2016.01)
  *H01M 8/248*   (2016.01)
  H01M 8/0438    (2016.01)
  H01M 8/0432    (2016.01)

(52) U.S. Cl.
  CPC ....... *H01M 8/2455* (2013.01); *H01M 8/2483* (2016.02); *H01M 8/0432* (2013.01); *H01M 8/0438* (2013.01); *Y02E 60/528* (2013.01)

(58) Field of Classification Search
  CPC .. H01M 8/248; H01M 8/2483; H01M 8/2485; Y02E 60/528
  USPC ................ 429/447, 455–458, 471, 512–514
  See application file for complete search history.

(56) References Cited

U.S. PATENT DOCUMENTS

| | | | |
|---|---|---|---|
| 4,927,509 A | 5/1990 | Mathur et al. | |
| 4,956,244 A | 9/1990 | Shimizu et al. | |
| 5,308,718 A | 5/1994 | Eidler et al. | |
| 5,368,762 A | 11/1994 | Sato et al. | |
| 5,601,943 A | 2/1997 | Eidler et al. | |
| 5,656,390 A | 8/1997 | Kageyama et al. | |
| 5,665,212 A | 9/1997 | Zhong et al. | |
| 5,725,967 A | 3/1998 | Mark | |
| 5,759,711 A | 6/1998 | Miyabayashi et al. | |
| 5,851,694 A | 12/1998 | Miyabayashi et al. | |
| 6,143,443 A | 11/2000 | Kazacos et al. | |
| 6,242,125 B1 | 6/2001 | Eidler et al. | |
| 6,416,653 B1* | 7/2002 | Barben et al. ............. | 205/787.5 |
| 6,461,772 B1 | 10/2002 | Miyake et al. | |
| 6,468,688 B2 | 10/2002 | Kazacos et al. | |
| 6,475,661 B1 | 11/2002 | Pellegri et al. | |
| 6,562,514 B1 | 5/2003 | Kazacos et al. | |
| 6,563,234 B2 | 5/2003 | Hasegawa et al. | |
| 6,761,945 B1 | 7/2004 | Adachi et al. | |
| 6,764,789 B1 | 7/2004 | Sekiguchi et al. | |
| 6,875,535 B2* | 4/2005 | Ye et al. .................. | 429/437 |
| 6,916,579 B2* | 7/2005 | Gorchkov et al. ........ | 429/231.1 |
| 7,061,205 B2 | 6/2006 | Shigematsu et al. | |
| 7,078,123 B2 | 7/2006 | Kazacos et al. | |
| 7,083,875 B2 | 8/2006 | Lillis et al. | |
| 7,181,183 B1 | 2/2007 | Hennessy | |
| 7,184,903 B1 | 2/2007 | Williams et al. | |
| 7,199,550 B2 | 4/2007 | Tsutsui et al. | |
| 7,220,515 B2 | 4/2007 | Ito et al. | |
| 7,227,275 B2 | 6/2007 | Hennessy et al. | |
| 7,258,947 B2 | 8/2007 | Kubata et al. | |
| 7,265,456 B2 | 9/2007 | Hennessy | |
| 7,353,083 B2 | 4/2008 | Hennessy | |
| 7,389,189 B2 | 6/2008 | Williams et al. | |
| 7,517,608 B2 | 4/2009 | Brereton et al. | |
| 7,682,728 B2 | 3/2010 | Harper | |
| 7,687,193 B2 | 3/2010 | Harper | |
| 7,704,634 B2 | 4/2010 | Deguchi et al. | |
| 7,740,977 B2 | 6/2010 | Lepp et al. | |
| 8,026,013 B2* | 9/2011 | Valensa et al. .......... | 429/458 |
| 8,048,555 B2* | 11/2011 | Darcy et al. .............. | 429/122 |
| 2004/0151953 A1* | 8/2004 | Kirk et al. ................. | 429/12 |
| 2004/0169493 A1 | 9/2004 | Tsutsui et al. | |
| 2004/0241544 A1 | 12/2004 | Nakaishi et al. | |
| 2005/0004716 A1 | 1/2005 | Lillis et al. | |
| 2005/0158614 A1 | 7/2005 | Hennessy | |
| 2005/0158615 A1 | 7/2005 | Samuel et al. | |
| 2006/0183016 A1* | 8/2006 | Kazacos ............ | B60L 11/1822 429/105 |
| 2007/0072067 A1 | 3/2007 | Symons et al. | |
| 2007/0202385 A1* | 8/2007 | Minamiura ....... | H01M 8/04186 429/458 |
| 2008/0241643 A1 | 10/2008 | Lepp et al. | |
| 2009/0004536 A1* | 1/2009 | Knauer et al. ............... | 429/34 |
| 2009/0047571 A1 | 2/2009 | Harper | |
| 2009/0311559 A1 | 12/2009 | Levine et al. | |
| 2010/0003545 A1 | 1/2010 | Home et al. | |
| 2010/0003586 A1 | 1/2010 | Sahu | |
| 2010/0021805 A1 | 1/2010 | Winter | |
| 2010/0136455 A1 | 6/2010 | Winter | |

FOREIGN PATENT DOCUMENTS

| | | |
|---|---|---|
| EP | 1385226 A1 | 1/2004 |
| GB | 2030349 A | 4/1980 |
| GB | 2085475 A | 4/1982 |
| JP | 63069151 A | 3/1988 |
| JP | 07153477 A | 12/1993 |
| JP | 07192776 A | 7/1995 |
| JP | 9283169 A | 10/1997 |
| JP | 200317763 | 11/2003 |
| JP | WO2006129635 A1 | 12/2006 |
| KR | 1019990076812 | 10/1999 |
| KR | 1020010106463 | 11/2001 |
| WO | WO 89/05363 | 6/1989 |
| WO | WO9003666 A1 | 4/1990 |
| WO | WO9939397 A1 | 8/1999 |
| WO | WO 2006/089415 A1 | 2/2006 |
| WO | WO2006081514 A2 | 8/2006 |
| WO | WO 2010/118060 A1 | 4/2010 |

OTHER PUBLICATIONS

Hagedorn, Mark, et al., "NASA Redox Cell Stack Shunt Current, Pumping Power, and Cell Performance Tradeoffs," National Aeronautics and Space Administration, Lewis Research Center, Feb. 1982, 30 pgs.

Hawkins, J.M, et at., "A field of a Vanadium Energy Storage System," INTELC 2001, Oct. 2001, pp. 652-656, Conference Publication No. 484.

"Flow Battery," Flow Battery Solutions, Mar. 15, 2013, <http://www.arbin.com/ products/flow-battery?gclid= CKvNqLXD7bUCFed1Ogod-jcAkQ>.

ZBB Energy Corporation, Menomonee Falls, Wisconsin, United States; Product Brochure, "The Focus of Avanced Energy Storage Systems"; (8 pgs.)

Premium Power Corporation, North Reading, Massachusetts, United States; Product Brochure, "TransFlow 2000 Utility-Scale Mobile Energy Storage System"; (2 pgs.).

Close, Tullis; "Energy storage—a key technology for global energy sustainability", Journal of Power Sources 100, 2-17, 2001 (16 pgs.).

Shigematsu, T.; Kumamoto T.; Deguchi, H.; and Hara, T.; "Applications of a Vanadium Redox-Flow Batter to Maintain Power Quality", Sumitomo Electric Industries, Ltd., IEEE 2002 (6 pgs.).

Barton, John P. and Infield, David G.; Energy Storage and Its Use with Intermittent Renewable Energy, IEEE Transactions on Energy Conversion, vol. 19, No. 2, Jun. 2004 (8 pgs.).

ZBB Energy Corporation, "The Focus of Advanced Energy Storage Systems," http://www.zbbenergy.com/pdf/ABB_CorpBrochure_Web.pd, 8 pgs.

Premium Power Corporation, "TransFlow 2000, Utility-Scale Mobile Energy Storage System," http://www.premiumpower.com/product/TF2000_2-pager.pdf, 2 pgs.

International Search Report and Written Opinion for PCT/US2011/038607 filed May 31, 2011, and dated Jan. 16, 2012, 34525/270 PCT, 10 pgs.

Nguyen, Trung and Savinell, Robert F.; "Flow Batteries", *The Electrochemical Society Interface*; Fall 2010 (3 pgs.).

Norris, Benjamin L.; Lex, Peter; Ball, Greg J.; and Scaini, Vince; "Grid-Connected Solar Energy Storage Using the Zinc-Bromine Flow Battery"; (4 pgs.).

Ponce De Leon, C.; Frias-Ferrer, A.; Gonzalez-Garcia, J.; Szanto, D.A.; and Walsh, F.C.; "Redox Flow Cells for Energy Conversion"; *Elsevier B.V. ScienceDirect, Journal of Power Sources* 160, 716-732; 2006 (17 pgs.).

Scamman, Daniel P.; Reade, Gavin W.; and Roberts, Edward P.L.; "Numerical Modelling of a Bromide-Polysulphide Redox Flow (56) References Cited

OTHER PUBLICATIONS

Battery Part 1: Modelling Approach and Validation for a Pilot-Scale System"; *Elsevier B. V. Journal of Power Sources* 189, 1120-1230; 2009 (9 pgs.).

Tokuda, Nobuyuki; Kanno, Takashi; Hara, Takushi; Shigematsu, Toshio; Tsutsui, Yasumitsu; Ikeuchi, Atsuo; Itou, Takefumi; and Kumamoto, Takahiro; "Development of a Redox Flow Battery System"; *SEI Technical Review*, No. 50; Jun. 2000 (7 pgs.).

Premium Power Corporation, North Andover, Massachusetts, United States; Powerblock 150 Specifications; (2 pgs.).

Premium Power Corporation, North Andover, Massachusetts, United States; Product Brochure, "Zinc-Flow 45 Regenerative fuel cell with DC output power, for uninterrupted operation of mission-critical site infrastructure"; (2 pgs.).

\* cited by examiner

INTEGRATED SYSTEM FOR ELECTROCHEMICAL ENERGY STORAGE SYSTEM

TECHNICAL FIELD

The present disclosure relates to electrochemical energy storage systems. In particular, the present disclosure relates to particular systems and methods for providing a compact framework in which to house an electrochemical energy storage system.

DETAILED DESCRIPTION OF PREFERRED EMBODIMENTS

Energy storage systems, such as electrochemical rechargeable batteries, are an important part of electrical power systems, particularly electrical power systems supplied by wind turbine generators, photovoltaic cells, and other non-dispatchable energy sources. Energy storage systems may also be used: to enable energy arbitrage (e.g., the selling and buying power during off-peak hours); as uninterruptible power sources (UPS) to provide backup power; and in power quality applications in conjunction with a prime power source.

According to various embodiments, an electrochemical energy storage system generates electrical power by passing liquid reactants through one or more electrochemical cells. An electrochemical energy storage system may include any number and configuration of cells, depending on the instantaneous power demands of the system. Similarly, an electrochemical energy storage system may have varying amounts of liquid reactants available to it, depending upon the energy capacity needs of the system. The number of cells may determine the amount of instantaneous power the electrochemical energy storage system is capable of producing and/or absorbing. The volume of liquid reactants available to the electrochemical battery generally defines its power storage and production capacity.

Commonly, electrochemical energy storage systems incorporate at least three main components, namely (1) a reaction cell (or series of such cells); (2) reactant storage tanks; and (3) a reactant distribution system for conveying reactants between the tanks and cells. The reactant distribution system may be a complex assembly. The reactant distribution system may include, among other things, pumps, pipes, sensors, and controls related thereto. These individual components may be held together by a structural framework or, in larger installations, may be installed directly onto a plant floor. The elements may be connected by discrete runs of pipe or hoses, as required. Instruments may be installed along these runs of pipe, and may be installed separately from the other components. This configuration, while functional, may lead to a system with a very large number of individual components. The costs of interconnecting pipes, fastening hardware, and the structures to support these parts may result in considerable cost.

The systems and methods disclosed herein may be utilized in a wide variety of types of the electrochemical energy storage systems that utilize a liquid reactant. For example, such electrochemical energy storage systems may utilize a vanadium redox based liquid reactant, a polysulfide bromide based liquid reactant, a zinc-bromine based liquid reactant, a cerium-zinc based liquid reactant, and a lead based liquid reactant.

Systems and methods disclosed herein employ various techniques in order to reduce the complexity and cost of electrochemical energy storage systems. The complexity and cost of an electrochemical energy storage system may be reduced by combining various components of a liquid reactant distribution system into a flow manifold. The flow manifold, in various embodiments, may provide a plurality of channels for distributing liquid reactant to an electrical cell stack. The flow manifold, in various embodiments, may be utilized in conjunction with a flow manifold cover. Other embodiments may include alternative structures for creating fluid pathways that may be utilized to distribute a liquid reactant in an electrochemical energy storage system. For example, different manufacturing processes (e.g., a lost-materials casting process or a rotational moulding process) may be utilized for forming fluid pathways in such embodiments. The flow manifold cover may be configured to support a variety of components of a liquid reactant system. Such components may include one or more liquid reactant pump motors, inlet and outlet ports, a reference cell, and a variety of sensors. The distribution of liquid reactants received via the inlet and outlet ports to the cell stack may be accomplished primarily by way of the flow manifold cover.

In certain embodiments, a flow manifold and a flow manifold cover may be directly coupled to a cell stack. As the term is used herein, a cell stack comprises a plurality of individual electrochemical cells. Coupling a flow manifold and a flow manifold cover to a cell stack may realize several advantages, including: (1) simplifying the installation of an electrochemical energy storage system by reducing the number of fluid connections to be created during the installation; (2) reducing the number of fluid connections within an electrochemical energy storage system may improve reliability; (3) reducing the size of electrochemical energy storage systems; (4) allowing for the production of electrochemical energy storage systems on a single production line as a unitized system; and (5) allowing for the use of common structural components for both the cell stack and the reactant distribution system.

Various embodiments disclosed herein may also realize certain advantages in safety and reliability. More specifically, by reducing the amount of exposed pipe and the number of interconnections through which reactant flows, there is a reduced likelihood of accidental damage to the pipes and interconnections during operation of the system. Further, pipes and interconnections in electrochemical energy storage systems may require the use of toxic bonding agents. Inasmuch as the embodiments disclosed herein require fewer fluid interconnections, such embodiments also require a reduced quantity of bonding agent. The advantages noted above, together with other advantages that will be realized by one having skill in the art, allow for the production, installation, and operation of the electrochemical energy storage systems that are safer, less costly, more compact, easier to produce, and less costly to install.

Figure 1:
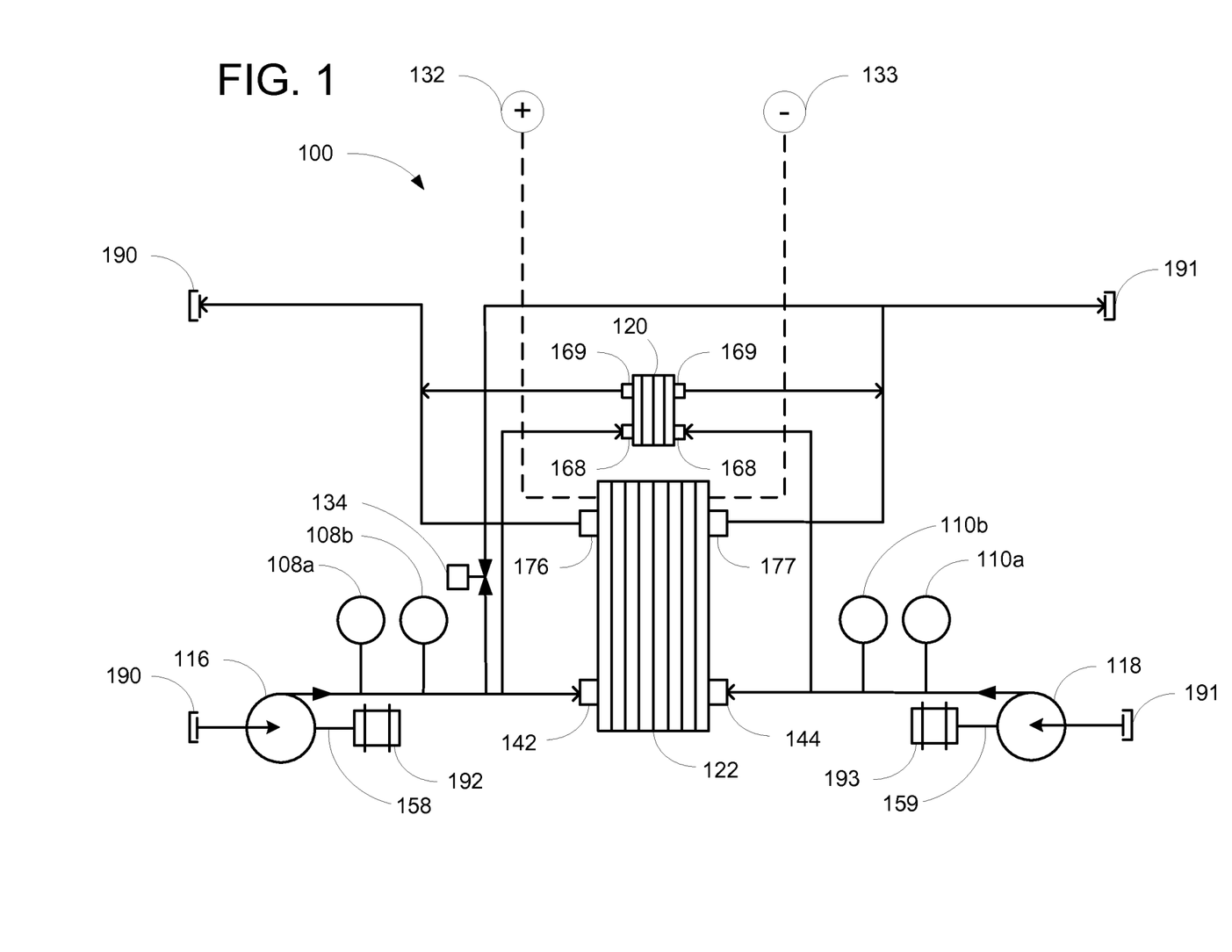
FIG. 1 is a block diagram of one embodiment of an electrochemical energy storage system.

FIG. 1 illustrates a block diagram of one embodiment of an electrochemical energy storage system 100 incorporating a cell stack 122. Cell stack 122 may comprise a plurality of individual electrochemical cells. Each of the plurality of individual electrochemical cells may operate as described in U.S. Pat. No. 7,687,193 (the "'193 patent"), titled Electrochemical Battery Incorporating Internal Manifolds, the entirety of which is incorporated herein by reference. One of skill in the art will appreciate that electrochemical energy storage systems may vary widely. The block diagram illustrated in FIG. 1 is shown for illustrative purposes. Any number of cells and a wide range of cell surface areas may be included in cell stack 122, as dictated by a particular application for which electrochemical energy storage system 100 may be used.

Cell stack 122 may include reactant inlet ports 142 and 144. The reactants may be supplied to reactant inlet ports 142 and 144 by pumps 116 and 118, respectively. Pumps 116 and 118 may draw a liquid reactant from reactant storage tanks 190 and 191. Pump motors 192 and 193 are connected to pumps 116 and 118 by driveshafts 158 and 159. One of reactant inlet ports 142 and 144 may be utilized to admit a positive reactant (e.g., an analyte solution), while the other port may be utilized to admit a negative reactant (e.g., a catholyte solution).

Reactant storage tanks 190 and 191 may store liquid reactant. One of reactant storage tanks 190 and 191 may store a positive reactant and the other may store a negative reactant. Cell stack 122 may also include reactant outlet ports 176 and 177, from which reactant may exit cell stack 122 and be returned to reactant storage tanks 190 and 191.

A reference cell 120 may provide an indication of the performance of cell stack 122. Reference cell 120 may receive reactant via inlet ports 168, and reactant may exit reference cell 120 by way of reference cell outlet ports 169. Measurements taken from cell stack 122 directly may fluctuate depending on how much power is instantaneously being drawn from cell stack 122. Based on the power fluctuation, directly monitoring the electrical output of cell stack 122 may provide a poor measure of the performance of the electrochemical energy storage system 100. In contrast, reference cell 120 may not be subject to similar fluctuations in power being drawn, and accordingly, reference cell 120 may provide a better indication of the overall performance of cell stack 122. Electrical leads (not shown) from reference cell 120 may be connected to a monitoring and/or control system (not shown). The electrical leads from reference cell 120 may be configured to monitor the open circuit voltage of reference cell 120.

Electrochemical energy storage system 100 may also include a variety of sensors and valves. Sensors 108a, 108b, 110a, and 110b may be configured to monitor certain characteristics of the liquid reactant. For example, sensors 108a and 108b may monitor the temperature and pressure of one reactant, while sensors 110a and 110b monitor the temperature and pressure of the other reactant. In addition, a remix valve 134 may be configured to selectively remix the reactants.

Electrical leads 132 and 133 may conduct electrical energy to, or from cell stack 122. Electrical leads 132 may be electrically coupled to one or more sources of electrical energy and one or more electrical loads. Depending upon the electrical power requirements of a connected electrical load, or depending on the electrical energy supply by an electrical source, pump motors 192 and 193 may adjust their speed in order to vary the amount of reactant passing through cell stack 122. In this way, cell stack 122 may absorb or supply a variable amount of electrical energy. A control system (not shown) may be employed in order to optimize the action of pump motors 192 and 193 based upon the need for, or the availability of electrical energy. Certain embodiments may employ a control system, as described in U.S. Patent Publication No. 2005/0158614, titled System and Method for Optimizing Efficiency and Power Output from a Vanadium Redox Battery Energy Storage System, the entirety of which is incorporated herein by reference.

As illustrated in FIG. 1, distribution of a reactant in an electrochemical energy storage system may involve numerous fluid connections. The performance and reliability of an electrochemical energy storage system is adversely affected by increasing the number of fluid connections in the system. Such connections may allow a reactant leak, and/or may require maintenance in order to prevent leaks. Further, creating each fluid connection during installation may be a costly and time-consuming task.

As disclosed herein, many fluid connections within an electrochemical energy storage system may be made by way of a flow manifold and a flow manifold cover. An electrochemical energy storage system, including a flow manifold and a flow manifold cover, may exhibit increased reliability because such systems may have a reduced amount of exposed tubing and a reduced number of exposed fluid connections. Further, such systems may be less costly to install because of the reduced number of fluid connections that must be made at the time of installation.

FIGS. 2A-2E illustrate various views of one embodiment of an electrochemical energy storage system 200, including a flow manifold 230 and a flow manifold cover 224. In FIGS. 2A-2E, like numbers are used to refer to like parts. In the various views shown in FIGS. 2A-2E, certain structures are more clearly illustrated in one view or another. Where appropriate, a specific figure may be referenced in connection with the discussion of a particular feature; however, FIGS. 2A-2E are not necessarily addressed sequentially, and each structure is not necessarily discussed in connection with each of FIGS. 2A-2E. In order to avoid obscuring aspects of the illustrated embodiment, not all structures are labeled in each of FIGS. 2A-2E.

Figure 2A:
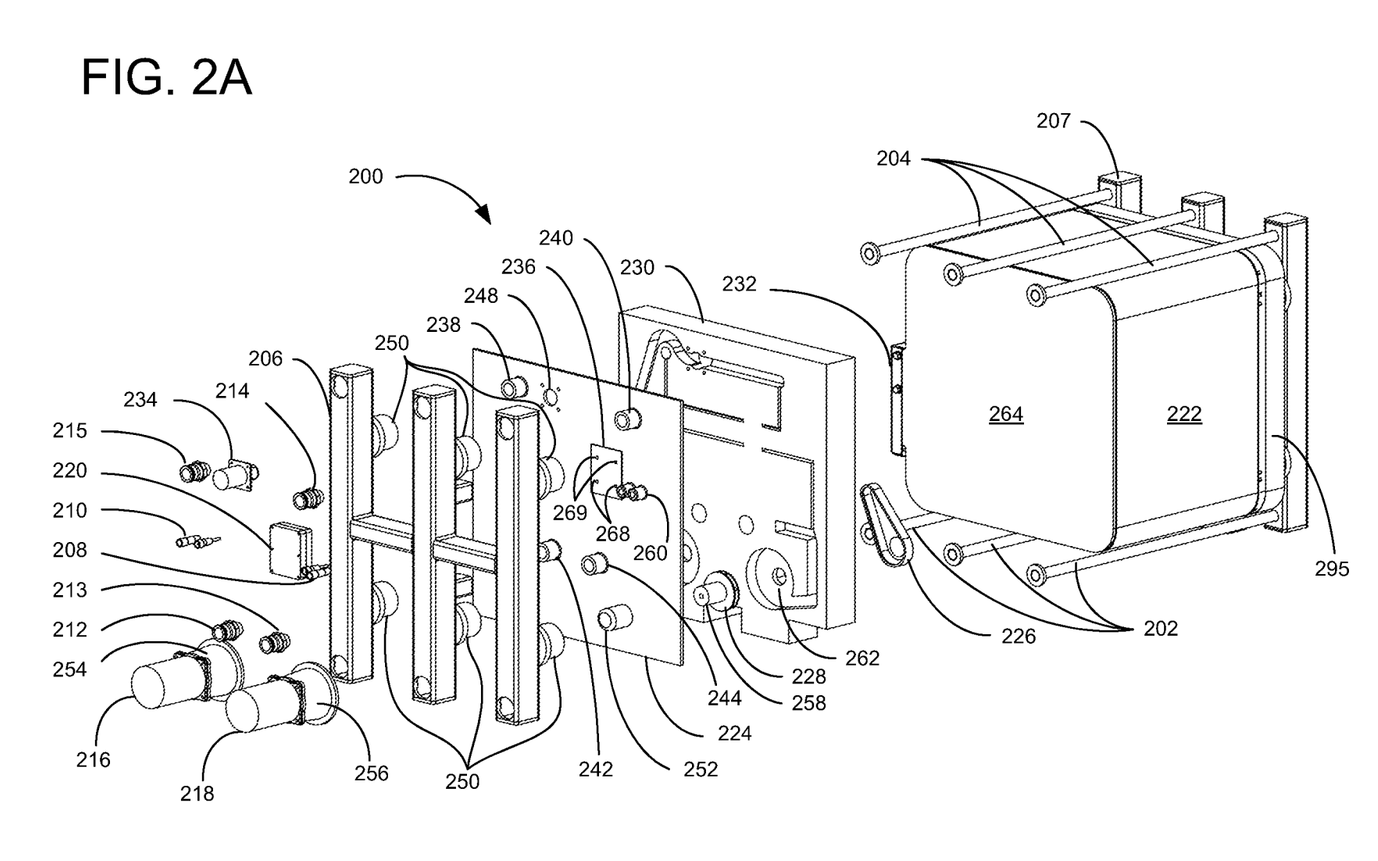
FIG. 2A is a partially exploded view of one embodiment of an electrochemical energy storage system, including a flow manifold and a flow manifold cover.
Figure 2B:
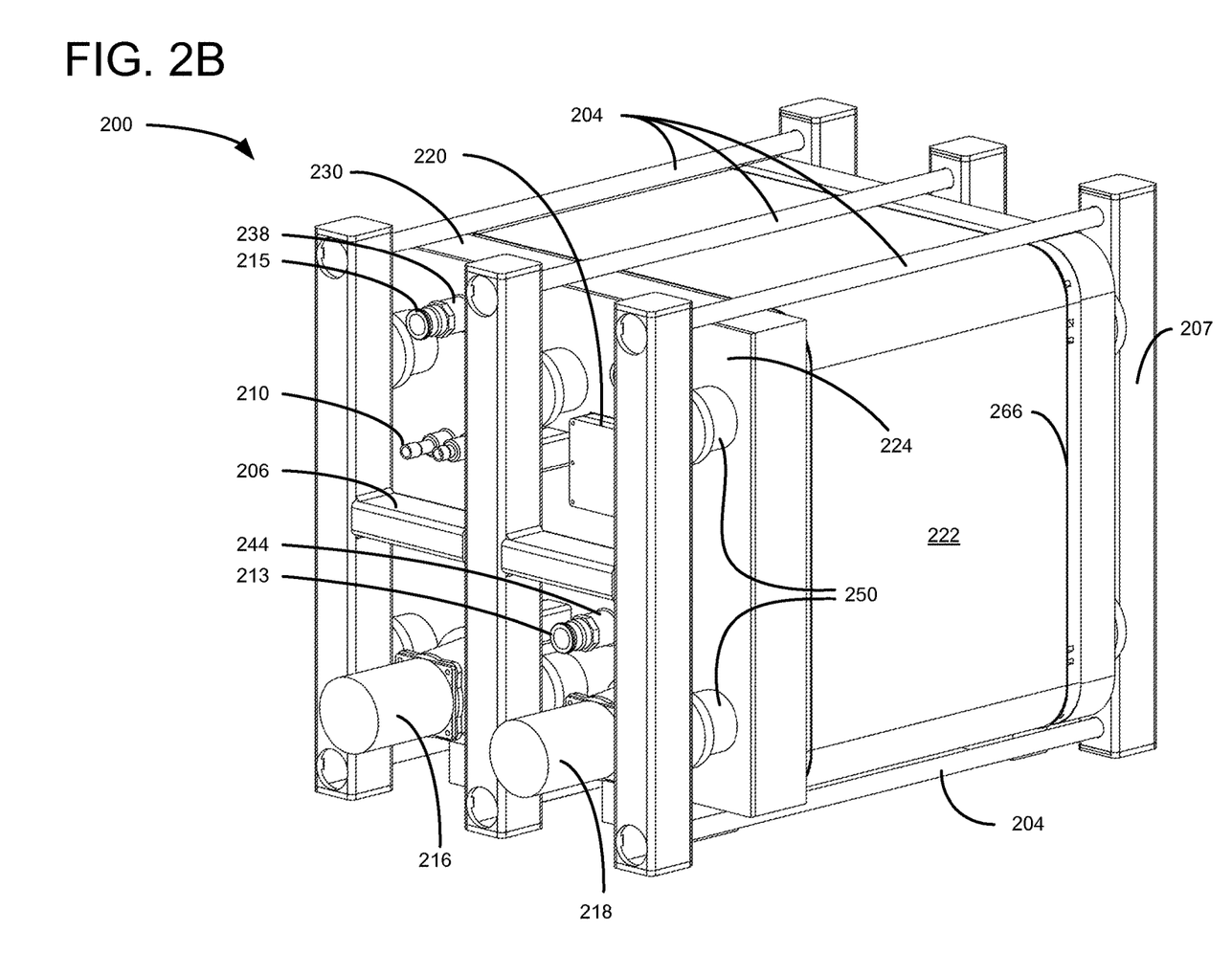
FIG. 2B is a perspective view of the electrochemical energy storage system shown in FIG. 2A.

FIG. 2A illustrates an exploded perspective view of an electrochemical energy storage system 200. Electrochemical energy storage system 200 includes a cell stack 222 in which a plurality of electrochemical cells may store or provide electrochemical energy. Each of the plurality of electrochemical cells may be embodied substantially as described in the '193 patent.

Figure 2C:
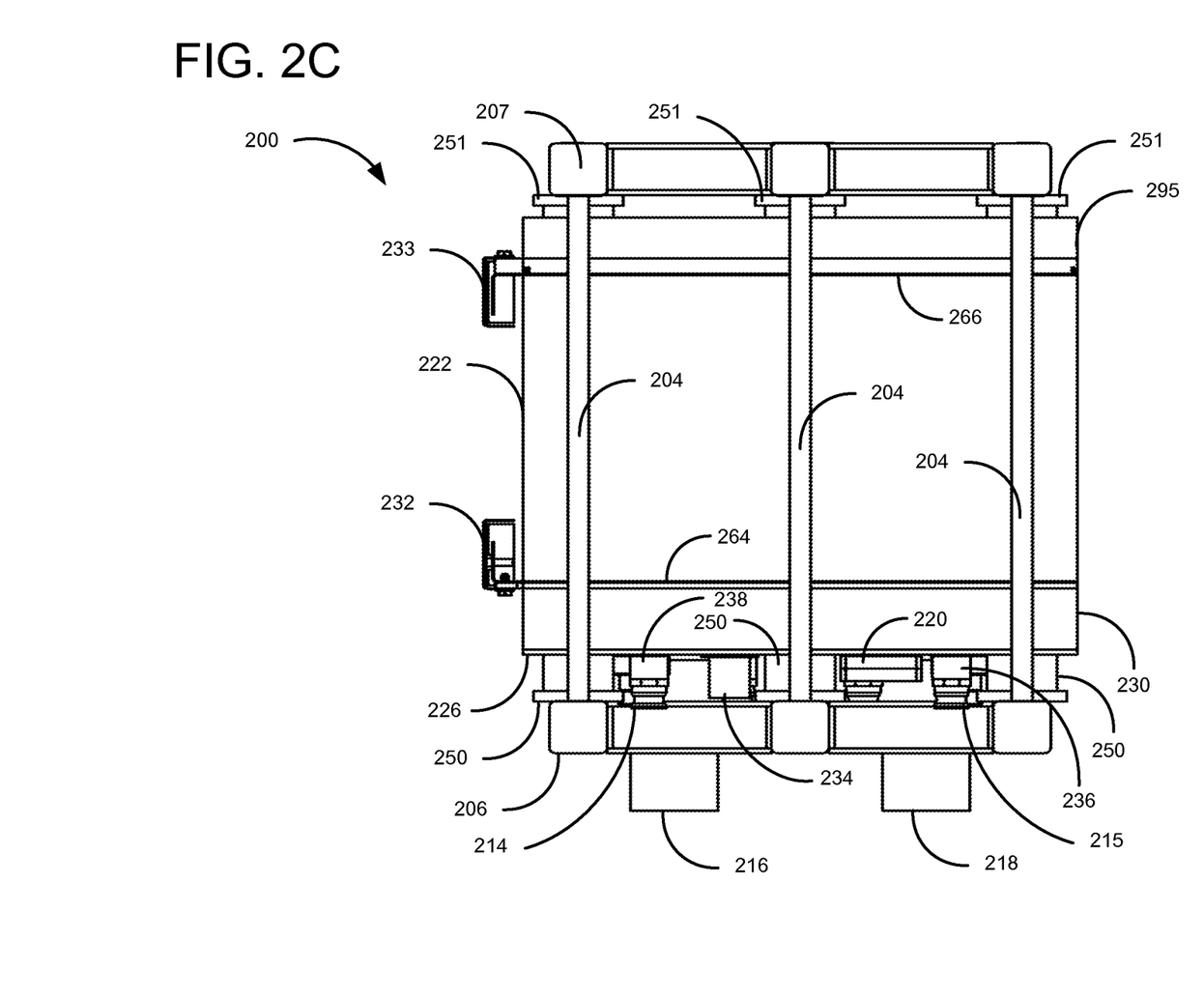
FIG. 2C is a top perspective view of the electrochemical energy storage system shown in FIG. 2A.
Figure 2D:
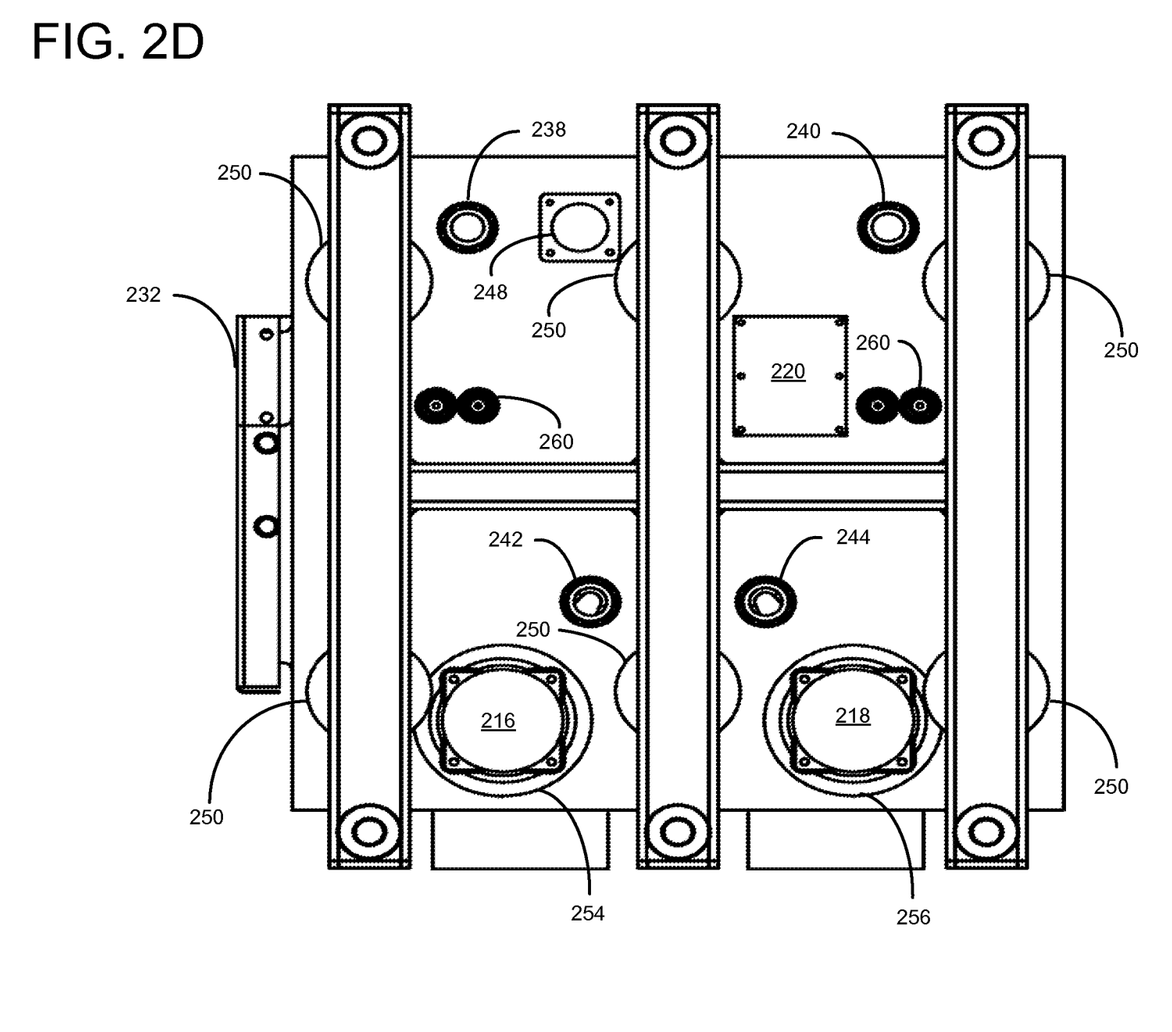
FIG. 2D is a side perspective view of the electrochemical energy storage system shown in FIG. 2A.

Electrochemical energy storage system 200 may include a front compression frame 206 and a rear compression frame 207. The top perspective view of FIG. 2C illustrates front compression frame 206 and rear compression frame 207. A plurality of stack pressure ties 204 and 202 may join front compression frame 206 and rear compression frame 207. An end plate 295 may be disposed between cell stack 222 and rear compression frame 207. End plate 295 may provide structural support to cell stack 222 on the side of electrochemical energy storage system 200 opposite from flow manifold 230. In an alternative embodiment, cell stack 222 may be laser welded to flow manifold 230.

A plurality of compression springs 250 may be disposed between front compression frame 206 and a flow manifold cover 224. As illustrated in FIG. 2C, a second plurality of compression springs 251 may be disposed between rear compression frame 207 and cell stack 222. Compression springs 251 may function to allow for thermal expansion and contraction of cell stack 220 due to changes in operating temperatures. Compression springs 251 may maintain an approximately constant force on cell stack 220, regardless of the operating temperature of electrochemical energy storage system 200. The front compression frame 206, rear compression frame 207, stack pressure ties 204, and compression springs 250 and 251 comprise a structural framework for housing cell stack 222 and various components that distribute liquid reactant within electrochemical energy storage system 200.

Flow manifold cover 224 and flow manifold 230 accommodate various pumps, sensors, valves, and reactant channels that distribute liquid reactants to cell stack 222. In the illustrated embodiment, flow manifold cover 224 includes a plurality of reactant port connectors 212-215 that allow a reactant to enter and exit electrochemical energy storage system 200. Reactant port connectors 212 and 213 may be in fluid communication with reactant inlet ports 242 and 244. One of reactant inlet ports 242 and 244 may be utilized to admit a positive liquid reactant (e.g., an analyte solution), while the other port is utilized to admit a negative liquid reactant (e.g., a catholyte solution). Reactant port connectors 214 and 215 may be in fluid communication with reactant outlet ports 238 and 240. One of reactant outlet ports 238 and 240 may be utilized to allow a positive reactant to exit electrochemical energy storage system 200, while the other port may be utilized to allow a negative reactant to exit electrochemical energy storage system 200. Reactant port connectors 212-215 may be utilized to connect the electrochemical energy storage system 200 to reservoirs containing positive and negative reactants. In certain embodiments, reactant port connectors 212-215 may comprise one-way valves in order to ensure that the liquid reactants flow in the appropriate direction.

Reactant may be circulated throughout electrochemical energy storage system 200 by pump motors 216 and 218. Pump motors 216 and 218 may be connected to flow manifold cover 224 using a pump housing 254 and a pump housing 256, respectively. Pump motor 218 may drive impeller 228. In the illustrated embodiment, flow manifold cover 224 includes an impeller port 252, through which an impeller driveshaft 258 may extend. Although not shown because of the perspective of FIG. 2, a second impeller, driveshaft, and port may be disposed opposite impeller 228, drive shaft 258, and impeller port 252. A flow manifold rear cover 226 may direct reactant from inlet port 244 to an impeller housing 262.

Flow manifold cover 224 may also accommodate other devices, such as a reference cell 220, sensors sets 208 and 210, and a remix valve 234. Sensor sets 208 and 210 may be embodied as a variety of types sensors. Various embodiments may include one or more of the following types sensors: pressure sensors, flow rate sensors, temperature sensors, hydrogen sensors, and the like. In the illustrated embodiment, reference cell 220 is disposed on flow cover 224. As discussed above, reference cell 220 may provide an indication of the electrical performance of the cell stack 222. Reference cell 220 may be attached to flow cover 224 using a reference cell mount 236. One set of sensors 208 and 210 may be in fluid communication with the positive reactant, while the other is in fluid communication with the negative reactant. Sensor set 208 may be received within flow pressure sensor ports 260. Remix valve 234 may also be disposed on flow manifold cover 224. Remix valve 234 may be in communication with the reactant by way of remix valve port 248.

Flow manifold cover 224 may abut flow manifold 230 and create a fluid seal. Flow manifold 230 may provide a fluid path connecting various inlet ports, outlet ports, and the cell stack. In the illustrated embodiment, flow manifold 230 abuts flow manifold cover 224 on one side and abuts cell stack 222 on the other side.

Electrochemical energy storage system 200 may include a front current collector 264 and rear current collector 266 (FIG. 2C) that is in electrical communication with cell stack 222. Current collectors 264 and 266 may collect electrical current from cell stack 222. Front current collector 264 may be disposed on the opposite end of cell stack 222 from rear current collector 266 in order to enable electrical current flow. Front current collector 264 may be in electrical communication with a front electrical connector 232, and rear current collector 266 may be in electrical communication with a rear electrical connector 233. Electrical connectors 232 and 233 may be utilized to connect electrochemical energy storage system 200 to an electrical power system. In certain embodiments the term bus plate may be utilized in place of the term current collector.

Figure 2E:
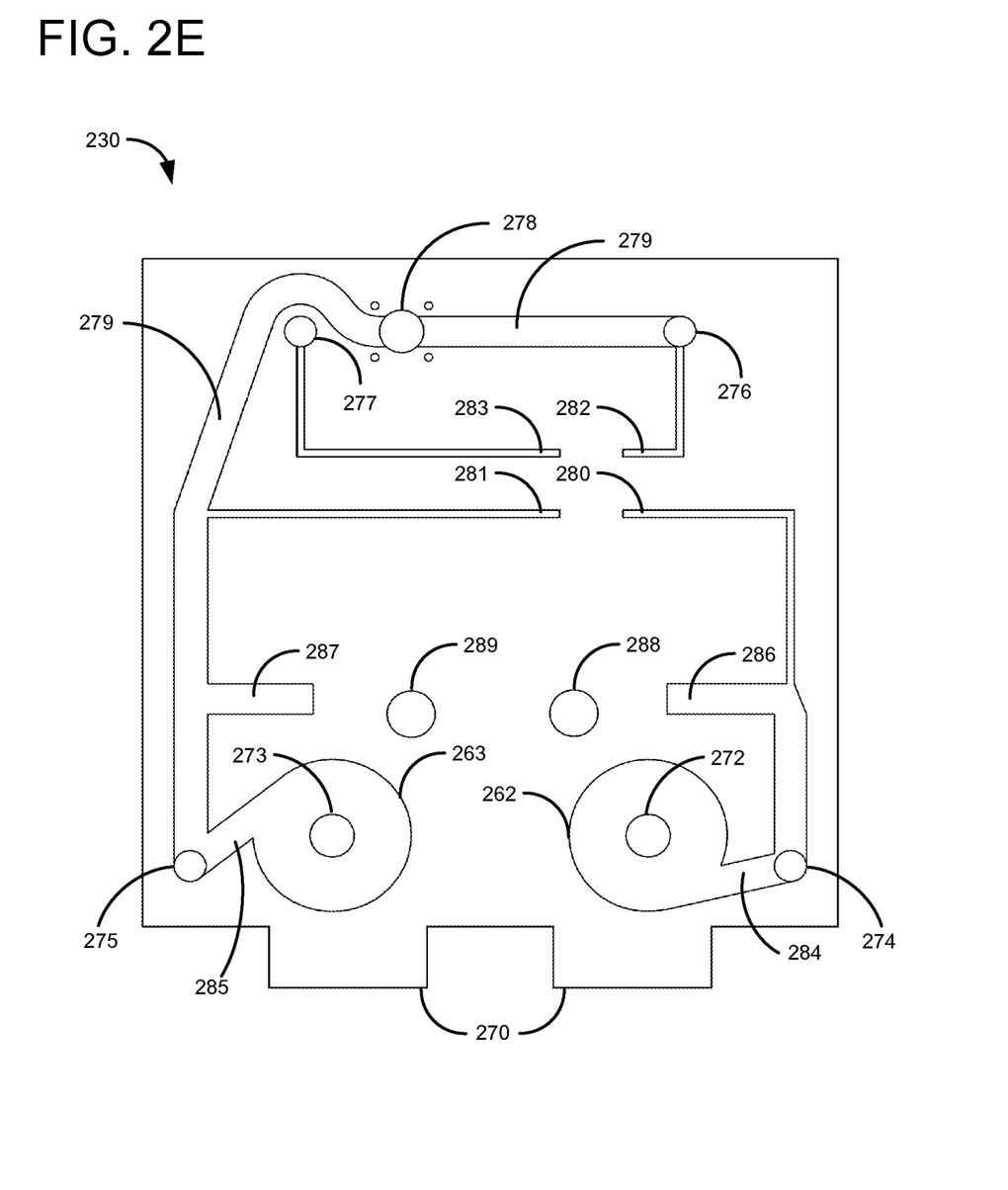
FIG. 2E is a perspective view of the flow manifold shown in FIG. 2A.

FIG. 2E illustrates a perspective view of flow manifold 230. The reactant may be received via reactant inlet apertures 288 and 289. The reactant received via reactant inlet apertures 288 and 289 may be conducted by flow manifold rear cover 226 and a second flow manifold rear cover (not shown) to impeller inlet apertures 272 and 273. The impeller inlet apertures 272 and 273 provide liquid reactant to impeller housings 262 and 263. Impellers 228 and a second impeller (not shown) may be connected to pump motors 216 and 218, respectively, and the impellers may rotate within the impeller housings 262 and 263. The operation of pump motors 216 and 218 may drive the reactant under pressure through reactant channels 284 and 285. The reactant may be supplied to cell stack 222 via cell stack inlet apertures 274 and 275. Reactant channels 284 and 285 may also conduct the reactant to sensor reactant channels 286 and 287. Received reactant may also be supplied to reference cell channels 280 and 281.

The reactant may exit cell stack 222 by way of cell stack outlet apertures 276 and 277. Cell stack outlet apertures 276 and 277 may also direct reactant to reference cell channels 282 and 283. Reference cell 220 may sit atop reference cell channels 280-283 in order to receive reactant from each inlet and outlet aperture. Accordingly, reference cell 220 may provide an indication of the performance of electrochemical energy storage system 200.

Operation of remix valve 234 may allow mixing of reactant exiting cell stack 222 by way of cell stack outlet apertures 276 and reactant received by way of reactant inlet aperture 289. Reactant from each of cell stack outlet aperture 276 and reactant inlet aperture 289 may be conducted to remix valve aperture 278 by way of remix channel 279. Remix valve 234 may allow for the restoration of energy capacity of the liquid reactant lost due to water and liquid reactant transfer across the membranes (not shown) in each cell (not shown) of cell stack 222.

As illustrated in FIG. 2A, the various reactant channels may be recesses or indentations in flow manifold 230. The various reactant channels may be sealed by flow manifold cover 224. With the exception of various apertures in a flow manifold cover 224, as described above, reactant may be sealed between flow manifold cover 224 and the various reactant channels. In various embodiments, a seal between flow manifold cover 224 and flow manifold 230 may be formed by discrete sealing components (i.e., gaskets, o-rings, etc.), by fusing flow manifold cover 224 and flow manifold 230 together (i.e., by welding) during a manufacturing process, or by maintaining a pressure or seal by exerting sufficient force between manifold cover 224 and flow manifold 230.

A plurality of electrochemical energy storage systems, such as electrochemical energy storage system 200, may be operated in concert in order to provide a desired amount of electrical energy storage. The embodiments described herein do not require discrete runs of pipe or hoses for internal distribution of reactant. Rather, distribution of reactant is accomplished by way of a flow manifold cover and a flow manifold. Accordingly, installation of the embodiments of electrochemical energy storage systems disclosed herein do not require on-site adjustments to allow for internal distribute liquid reactant. Accordingly, such systems may be produced on a single production line as a unitized system.

It will be obvious to those having skill in the art that many changes may be made to the details of the above-described embodiments without departing from the underlying principles of the invention. The scope of the present invention should, therefore, be determined only by the following claims.

The invention claimed is:

1. An electrochemical energy storage system, comprising:
   (a) an electrochemical cell stack;
   (b) a liquid reactant distribution system, comprising:
      (i) a flow manifold cover, comprising:
         a plurality of reactant ports, including an anolyte input, an anolyte output, a catholyte input, and a catholyte output,
         a plurality of mounting points to support a plurality of liquid reactant distribution system components mounted on the flow manifold cover via mechanical coupling of the liquid reactant distribution system components to the mounting points, and
         a plurality of component ports distinct from the plurality of reactant ports, at least one of the plurality of component ports in fluid communication with at least one of the plurality of mounted liquid reactant distribution system components; and
      (ii) a flow manifold, comprising,
         a plurality of flow manifold apertures to provide fluid communication with the electrochemical stack,
         a plurality of liquid reactant flow channels to receive a liquid reactant from the plurality of reactant ports and to distribute the liquid reactant to the plurality of flow manifold apertures and the at least one of the plurality of component ports;
   (c) a first liquid reactant tank comprising an anolyte reservoir, wherein the anolyte input and the anolyte output are in fluid communication with the anolyte reservoir;
   (d) a second liquid reactant tank comprising a catholyte reservoir, wherein the catholyte input and the catholyte output are in fluid communication with the catholyte reservoir; and
   (e) a reference cell mounted on an outer surface of the flow manifold cover, wherein the reference cell provides an indication of the electrical performance of the electrochemical cell stack,
   wherein the first liquid reactant tank, the second liquid reactant tank, and the liquid reactant distribution system are external to an outer enclosure housing the electrochemical cell stack, and
   wherein the flow manifold is disposed outside of the outer enclosure housing the electrochemical cell stack and between the electrochemical stack and the flow manifold cover.

2. The electrochemical energy storage system of claim 1, further comprising a first liquid reactant pump motor and a second liquid reactant pump motor, and wherein the plurality of mounting points comprises a plurality of mounting points for the first liquid reactant pump motor and the second liquid reactant pump motor.

3. The electrochemical energy storage system of claim 2, wherein the first liquid reactant pump motor and the second liquid reactant pump motor each comprise an impeller, and wherein the flow manifold comprises,
   a first impeller housing configured to receive the impeller of the first liquid reactant pump motor, and
   a second impeller housing configured to receive the impeller of the second liquid reactant pump motor.

4. The electrochemical energy storage system of claim 1, further comprising a gasket disposed between the flow manifold and the flow manifold cover, the gasket to facilitate the fluid seal at least partially along the length of at least one of the plurality of liquid reactant flow channels.

5. The electrochemical energy storage system of claim 1, wherein the plurality of liquid reactant flow channels comprise a plurality of reference cell channels.

6. The electrochemical energy storage system of claim 5, wherein the plurality of component ports comprise a plurality of apertures configured to permit fluid communication between the plurality of reference cell channels and the reference cell.

7. The electrochemical energy storage system of claim 1, wherein the flow manifold cover further comprises a plurality of liquid reactant port connectors in fluid communication with the plurality of reactant ports.

8. The electrochemical energy storage system of claim 7, wherein the plurality of reactant ports provide fluid communication between at least one of the plurality of liquid reactant port connectors and at least one of the plurality of liquid reactant flow channels.

9. The electrochemical energy storage system of claim 1, further comprising a plurality of sensors to monitor at least one characteristic of the liquid reactant.

10. The electrochemical energy storage system of claim 9, wherein the plurality of component ports are configured to receive the plurality of sensors and to provide fluid communication between the plurality of sensors and the liquid reactant flow channels.

11. The electrochemical energy storage system of claim 9, wherein the plurality of sensors comprises a pressure sensor and a temperature sensor.

12. The electrochemical energy storage system of claim 1, wherein the liquid reactant distribution system further comprises a remix valve, and wherein the flow manifold cover comprises a mounting point to receive the remix valve.

13. The electrochemical energy storage system of claim 12, wherein the flow manifold comprises a liquid reactant remix channel.

14. The electrochemical energy storage system of claim 13, wherein the flow manifold comprises a remix valve aperture.

15. The electrochemical energy storage system of claim 1, further comprising a support framework to support the electrochemical stack, the flow manifold, and the flow manifold cover, wherein the support framework comprises a plurality of compression springs disposed between the support framework and the flow manifold cover, and wherein the plurality of compression springs facilitate the fluid seal at least partially along the length of at least one of the plurality of liquid reactant flow channels.

16. The electrochemical energy storage system of claim 1, wherein the electrochemical cell stack is configured to operate using a vanadium redox based liquid reactant.

17. The electrochemical energy storage system of claim 1, wherein the electrochemical cell stack is configured to operate using at least one of a polysulfide bromide based liquid reactant, a zinc-bromine based liquid reactant, a cerium-zinc based liquid reactant, and a lead based liquid reactant.

18. The electrochemical energy storage system of claim 15, wherein the support framework comprises:
   a first compression frame,
   a second compression frame, and
   a plurality of compression ties connecting the first compression frame to the second compression frame.

19. An electrochemical energy storage system, comprising:
   (a) an electrochemical cell stack;
   (b) a flow manifold plate to distribute a plurality of liquid reactants within the electrochemical energy storage system, the flow manifold plate comprising:
   a plurality of flow manifold apertures to provide fluid communication with the electrochemical cell stack;
   a plurality of liquid reactant flow channels to receive a plurality of liquid reactants and to distribute the plurality of liquid reactants to the plurality of flow manifold apertures, wherein the plurality of liquid reactant flow channels comprise a plurality of recessed channels on a side of the flow manifold plate, and wherein the plurality of liquid reactant flow channels includes a plurality of reference cell channels;
   a first impeller housing recessed in the flow manifold plate and shaped and sized to receive an impeller of a first liquid reactant pump motor, wherein the first impeller housing distributes a first liquid reactant to at least one of the plurality of flow manifold apertures, wherein the first liquid reactant is an anolyte solution;
   a first impeller inlet aperture to provide the first liquid reactant to the first impeller housing;
   a second impeller housing recessed in the flow manifold plate and shaped and sized to receive an impeller of a second liquid reactant pump motor, wherein the second impeller housing distributes a second liquid reactant to at least one of the plurality of flow manifold apertures, wherein the second liquid reactant is a catholyte solution, and wherein the second impeller housing is distinct from the first impeller housing; and
   a second impeller inlet aperture to provide the second liquid reactant to the second impeller housing; and (c) a reference cell situated atop and in fluid communication with the plurality of reference cell channels, wherein the reference cell provides an indication of electrical performance of the electrochemical cell stack,
   wherein the flow manifold plate and the reference cell are external to an outer enclosure housing the electrochemical cell stack, and
   wherein the plurality of liquid reactants is selected from the group consisting of a vanadium redox based liquid reactant, a polysulfide bromide based liquid reactant, a zinc-bromine based liquid reactant, a cerium-zinc based liquid reactant, and a lead based liquid reactant.

20. An electrochemical energy storage system, comprising:
   (a) an electrochemical cell stack;
   (b) a liquid reactant distribution system, comprising:
      (i) a flow manifold cover, comprising:
         a plurality of reactant ports, including an anolyte input, an anolyte output, a catholyte input, and a catholyte output,
         a plurality of mounting points to support a plurality of liquid reactant distribution system components mounted on the flow manifold cover via mechanical coupling of the liquid reactant distribution system components to the mounting points, and
         a plurality of component ports distinct from the plurality of reactant ports, at least one of the plurality of component ports in fluid communication with at least one of the plurality of mounted liquid reactant distribution system components; and
      (ii) a flow manifold, comprising,
         a plurality of flow manifold apertures to provide fluid communication with the electrochemical cell stack,
         a plurality of liquid reactant flow channels to receive a liquid reactant from the plurality of reactant ports and to distribute the liquid reactant to the plurality of flow manifold apertures and the at least one of the plurality of component ports; and
   (c) a reference cell mounted on an outer surface of the flow manifold cover and in fluid communication with at least one of the plurality of component ports, wherein the reference cell provides an indication of the electrical performance of the electrochemical cell stack,
   wherein the liquid reactant distribution system is external to an outer enclosure housing the electrochemical cell stack, and
   wherein the flow manifold is disposed between the electrochemical cell stack and the flow manifold cover.

* * * * *